United States Patent Office 3,002,965
Patented Oct. 3, 1961

3,002,965
NUCLEOSIDES AND THEIR PREPARATION
Jack J. Fox, White Plains, N.Y., and Robert Duschinsky, Essex Fells, N.J., assignors to Hoffmann-La Roche Inc., Nutley, N.J., a corporation of New Jersey
No Drawing. Filed Apr. 17, 1958, Ser. No. 729,060
13 Claims. (Cl. 260—211.5)

This invention relates to novel chemical compounds and to a process for preparing those compounds. It also relates to novel intermediates useful for preparing the new compounds. More particularly, the invention relates to $N_1$-glycosyl derivatives of 5-fluorocytosine and to salts of said nucleosides with medicinally acceptable acids as well as to a method for the preparation of said nucleosides and salts.

In a more particular aspect, the invention relates to $N_1$-ribosyl and $N_1$-2′-deoxyribosyl derivatives of 5-fluorocytosine. Specifically, the invention pertains to 1-β-D-ribofuranosyl-5-fluorocytosine (which also may be referred to as 5-fluorocytidine represented by Formula I, 1-β-D-2′-deoxyribofuranosyl-5-fluorocytosine (which also may be referred to as 2′-deoxy-5-fluorocytidine), represented by Formula II, and medicinally acceptable salts of those compounds.

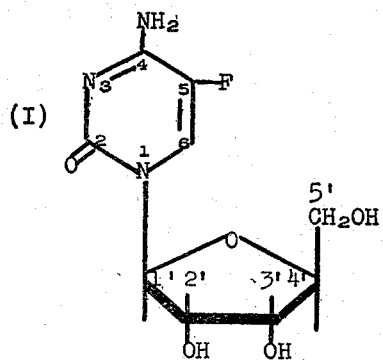

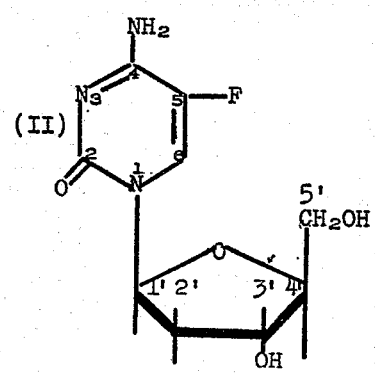

The process for preparing 5-fluorocytidine and 2′-deoxy-5-fluorocytidine and the novel intermediates synthesized in the process are also part of the invention. The method comprises reacting an O-acyl ester of 5-fluorouridine, e.g. 2′,3′,5′-tri-O-benzoyl-5-fluorouridine or 3′,5′-di-O-benzoyl-2′-5-fluorouridine, with a thiating agent, such as phosphorous pentasulfide, in a basic medium, such as pyridine or quinoline, thereby producing the corresponding O-acyl ester of 4-thio-5-fluorouridine, i.e. 2′,3′,5′-tri-O-benzoyl-4-thio-5-fluorouridine and 3′,5′,-di-O-benzoyl-4-thio-2′-deoxy-5-fluorouridine, respectively. The O-acyl ester is then treated with excess ammonia, preferably with heating, to obtain, respectively, 5-fluoro-cytidine or 2′-deoxy-5-fluorocytidine. The O-acyl esters used in the process are, for example, lower alkanoyl esters, such as acetyl, or aralkanoyl esters, such as benzoyl.

The $N_1$-filycosyl derivatives of 5-fluorocytosine are basic compounds which form acid addition salts with inorganic and organic acids. For example, the compounds may be reacted with about an equimolecular proportion of the appropriate strong inorganic or organic acid to obtain salts such as the hydrohalides, e.g. hydrochloride, hydrobromide, etc., sulfate, nitrate, picrate, etc.

The $N_1$-glycosyl derivatives of 5-fluorocytosine are useful as antimetabolites, interfering with nucleic acid metabolism, and as bacteriostatic agents, being active, for example, against gram positive bacteria such as Staphylococcus aureus and Lactobacillus leichmannii and gram negative bacteria such as Proteus vulgaris, and against fungi, such as Paecilomyces varioti and Penicillium digitatum. The substances may be administered in the form of the base or a medicinally acceptable acid addition salt thereof.

The following examples are illustrative of the invention. All temperatures are stated in degrees centigrade.

EXAMPLE 1

A well stirred mixture containing 21.4 g. (0.037 mol) of 2′,3′,5′-tri-O-benzoyl-5-fluorouridine, 28 g. (0.013 mol) of phosphorus pentasulfide, 350 ml. pyridine and 0.8 ml. of water was heated to reflux. The clear, orange solution was treated dropwise with additional water until a turbid orange solution was maintained. After 6½ hours at reflux temperature, the reaction mixture was cooled and poured into a vigorously stirred slurry of ice water. The granular precipitate which formed was removed by filtration. The solid material thus obtained was dissolved in 600 ml. chloroform and separated from a small amount of insoluble material by filtration. The chloroform solution was washed twice with water and dried over sodium sulfate. The chloroform solution was then concentrated in vacuo. The crude solid residue was crystallized from two liters of hot ethanol, yield 15.7 g. (72%), M.P. 182–184°. An aliquot of the crude 2′,3′,5′-tri-O-benzoyl-4-thio-5-fluorouridine was recrystallized from ethanol, M.P. 183.5–184°.

Analysis.—Calculated for $C_{30}H_{23}FN_2O_8S$: C, 61.01; H, 3.93; N, 4.74; S, 5.43. Found: C, 61.23; H, 4.23; N, 4.51; S, 5.79.

12 g. of 2′,3′,5′-tri-O-benzoyl-4-thio-5-fluorouridine were heated with 200 ml. ethanolic ammonia (saturated solution at 0°) in a sealed tube for 15 hours at 85°. The material dissolved slowly. The greenish solution was then concentrated to dryness in vacuo. Water was added and the insoluble material was removed by filtration. The aqueous filtrate was subjected to steam distillation in order to remove ethyl benzoate. The residual water solution was extracted three times with chloroform, treated with charcoal and the aqueous layer was concentrated to dryness in vacuo. The material was co-distilled with toluene to remove the last traces of water. To the syrup thus obtained, comprising 5-fluorocytidine, was added ethanol and the mixture was treated with hydrogen chloride gas while cooling moderately. First a clear solution formed and then a fine white precipitate. After cooling and filtering, 5.2 g. of crude 5-fluorocytidine hydrochloride was obtained, M.P. 173–174°.

Ion exchange chromatography demonstrated that the material thus produced contained about 55% of pure 5-fluorocytidine. The rest is cytidine and possibly a small amount of 5-ethoxycytidine.

0.15 g. of crude 5-fluorocytidine hydrochloride dissolved in 2 ml. of 1 N HCl was passed through a 1.1 cm. x 17 cm. column of ion exchange resin Dowex 50–X2, 100–200 mesh [a strongly acidic cation exchange resin consisting of cross linked styrene-divinyl benzene copolymers (2% of divinyl benzene) containing sulfonic acid groupings as the functional groups]. The column was eluted with 1 N HCl collecting fractions of 20 ml. per half hour. Evaporation of fraction 3 yielded a glassy residue which was crystallized from a mixture of 10 ml. ethanol and 3 ml. methanol. The 5-fluorocytidine hydrochloride melted at 177–179°.

Calculated for $C_9H_2N_3O_5F \cdot HCl$: C, 36.31; H, 4.40; N, 14.12. Found: C, 36.31; H, 4.82; N, 13.97.

To obtain 5-fluorocytidine base in pure form, the following procedure was carried out:

Dowex 50-X2 (a strongly acidic cation exchange resin described above), 100–200 mesh, was consecutively washed with hydrochloric acid, water and aqueous ammonia (30 ml. concentrated ammonia in 100 ml. water) and again washed to neutrality with water to produce the ammonium form of the resin.

A solution of 3.03 g. of crude 5-fluorocytidine hydrochloride in 12 ml. of water was passed through a 2.2 cm. x 40 cm. column of the resin described above. The material adsorbed on the resin was eluted with distilled water and approximately 20 ml. fractions were collected half hourly. The individual fractions were examined for ultraviolet absorption at wave lengths of 280 m$\mu$ and 300 m$\mu$ in 0.1 N HCl. The figures in Table I represent the total absorption of the fraction (obtained by multiplication of the extinction value $\times$ the dilution of the sample $\times$ the volume of the sample). When water elution gave no more material showing ultraviolet absorption in fraction 142, the elution was continued with 0.02 N ammonia.

Table I

| Fraction | Total 280 m$\mu$ | Absorption m$\mu$ | $\frac{300}{280}$ | Identification |
| --- | --- | --- | --- | --- |
| Starting mat. | 115,000 | 67,000 | 0.592 | NH$_4$Cl. |
| 1–3 | | | | |
| 4 | 990 | 1,120 | 1.13 | |
| 5 | 97 | 117 | 1.2 | |
| 6–9 | | | | |
| 10–55 | 45,000 | 43,800 | .973 | 5.66 mM 5-fluorocytidine (=1.48 g. calculated as base or 1.69 g. calculated as hydrochloride). |
| 56–90 | 7,520 | 7,320 | .986 | |
| 91–142 | 3,480 | 3,330 | .96 | |
| 143–185 | 5,860 | 2,190 | .374 | |
| 186 | 740 | 200 | .27 | |
| 187–202 | 37,700 | 8,285 | .22 | 2.81 mM cytidine (=0.572 g. calculated as base or 0.786 g. calculated as hydrochloride). |

Fractions 10 to 90 were combined and evaporated to dryness in vacuo. The glass-like residue was extracted with 37 ml. of hot ethanol. The solution obtained was separated by filtration from some insoluble brown material. Upon cooling, crystals precipitated which were filtered and washed with ethanol and ether. Yield, 0.89 g. The substance, 5-fluorocystidine, began to melt at about 190°, resolidified and melted again at 199–200°. A sample recrystallized from ethanol gave similar melting point characteristics. The mother liquor was evaporated to dryness and the residue was similarly crystallized to give 0.12 g. of identical material. Fractions 91 to 142, upon similar treatment, gave an additional crop of 20 mg. of 5-fluorocytidine to give a total yield of 1.03 g. of crystalline base (33% of theory based on 2',3',5'-tri-O-benzoyl-4-thio-5-fluorouridine).

Calculated for $C_9H_{12}O_5N_3F$: C, 41.38; H, 4.63; N, 16.08. Found: C, 41.54; H, 4.80; N, 15.99.

Fractions 187–202 yielded upon evaporation and crystallization from 100 ml. methanol and 100 ml. petroleum ether, 0.42 g. of clustered needles, melting at 214–215°. Comparison of the ultraviolet spectrum and a mixed melting point with an authentic sample established the identity of the material melting at 214–215° with cytidine.

The starting compound, 2',3',5'-tri-O-benzoyl-5-fluorouridine, not part of this invention, is itself novel and may be synthesized by the method described below:

To a solution of 65 g. (500 mM) of 5-fluorouracil in 2350 ml. of aqueous sodium hydroxide [containing 8 g. (200 mM) of NaOH] there was added a solution of 136 g. (500 mM) of mercuric chloride in 452 ml. of ethanol. The pH of the mixture was adjusted to 5.1 by addition of 450 ml. of 1 N aqueous sodium hydroxide, whereupon mercury-di-5-fluorouracil precipitated. The mixture was allowed to remain overnight at 4°, and the crystalline product was then filtered off and washed chlorine-free with water, then with ethanol and finally with diethyl ether. Yield, 98.3 g. (85.7%).

750 ml. of anhydrous ether were cooled to 0° and saturated with dry HCl gas (about 275 g. HCl were absorbed). 35.3 g. (0.07 mol) of 1-O-acetyl-2,3,5-tri-O-benzoyl-$\beta$-D-ribose [prepared by the Kissmann et al. modification of the Fletcher synthesis, J.A.C.S. 77, 21 (1955); J.A.C.S. 76, 763 (1954)], previously dried at 50° in vacuo, were dissolved in the cold HCl-ether solution. 28 ml. of acetyl chloride were then added and the mixture was stored at 0° C. for eight days. During this period, after three days, the cold solution was resaturated with HCl gas; uptake about 15 g.

The solution was then evaporated in vacuo below 50° until a syrup remained. The residue was extracted three times with 125 ml. portions of dry benzene. Each time the solvent was removed in vacuo. The residual syrup was finally dissolved in 190 ml. of dry toluene and slowly added to a dry suspension of mercury-di-5-fluorouracil as follows: 16 g. (0.035 mol) of the mercury-di-5-fluorouracil were suspended in 255 ml. of toluene with stirring. 100 ml. of toluene were distilled off at atmospheric pressure. The mixture was allowed to cool somewhat and 100 ml. of dry toluene were added. 85 ml. of toluene were distilled off as before. To this suspension of mercury-di-5-fluorouracil the toluene solution of 1-O-acetyl-2,3,5-tri-O-benzoyl-$\beta$-D-ribose were slowly added at about 100°.

The mixture thus obtained was then refluxed at 108° for 1¾ hours. The reaction mixture was filtered at the boiling point and the filtrate was cooled in the refrigerator for two days. The crude 2',3',5'-tri-O-benzoyl-5-fluorouridine which precipitated was filtered off and dried in vacuo, yield 18 g. (52%).

The crude 2',3',5'-tri-O-benzoyl-5-fluorouridine was purified by dissolving 10 g. of the crude material in 350 ml. of chloroform in a one liter, three-neck flask provided with a stop cock at the bottom and connected to a reflux condenser. The solution was heated to 50° with stirring. To the clear solution which resulted were added dropwise 100 ml. of 30% potassium iodide with stirring. The mixture was stirred for 15 minutes. The two phases were permitted to separate while the temperature was maintained at about 45–50°. The heavier chloroform layer was drawn off and the aqueous phase was decanted.

The chloroform phase was washed twice with 150 ml. portions of water at 50°. The washed chloroform phase, while still warm, was treated with sodium sulfate until the mixture cleared, and filtered. The filtrate was evaporated to about 100 ml. in vacuo and the residue was cooled in the refrigerator overnight.

The purified 2',3',5'-tri-O-benzoyl-5-fluorouridine was filtered off, washed with a little ice cold chloroform, filtered under suction and dried in vacuo, yield, 6.5 g. (65%), M.P. 215–217°.

5-fluorocytidine and its medicinally acceptable salts were useful as antibacterial and antifungal agents being active, for instance, against *Paecilomyces varioti, Bacillus simplex, Sarcina lutea, Bacillus subtilis, Penicillium digitatum, Staphylococcus aureus, Lactobacillus leichmannii* and the like.

EXAMPLE 2

A mixture of 3.6 g. (0.5 mol) of crude 2'-deoxy-5-fluorouridine (approximately 90% pure), 100 ml. of anhydrous pyridine and 4.2 g. (0.03 mol) of benzoyl chloride was heated at 55–60° for 60 hours. The resulting yellow solution was cooled and poured in a thin stream into a vigorously stirred ice water slurry. A fine white solid immediately precipitated. The mixture was stirred for one hour and the suspension was then filtered. The solid material thus obtained was washed repeatedly with cold water, cold alcohol and finally with ether. The crude 3′,5′-di-O-benzoyl-2′-deoxy-5′-fluorouridine (6 g.) thus obtained melted at 235–236.5°. Recrystallization from ethyl acetate, and then from methanol yielded crystalline 3′,5′ - di - O - benzoyl - 2′ - deoxy - 5 - fluorouridine melting at 236.5–237.5°.

in 20 ml. of hot ethanol. After filtering, the solution was cooled and mixed with 25 ml. of petroleum ether. Upon standing overnight, crystals precipitated which were filtered off, washed with a 1:2 mixture of ethanol-petroleum ether and finally with petroleum ether. Yield, 77 mg. of 1-β-D-2′-deoxyribofuranosyl-5-fluorocytosine (2′-deoxy-5-fluorocytdine), M.P. 180–182°. The mother liquor gave, upon the addition of 95 ml. of petroleum ether, a second crop of 50 mg. for a total yield of 127 mg. (24.3% of theory).

*Analysis.*—Calculated for $C_9H_{12}FN_3O_4$: C, 44.08; H, 4.92. Found: C, 44.43; H, 5.00.

Table II
SPECTROPHOTOMETRIC DATA

| | Medium | Maximum | | Minimum | | 280/260 | 300/280 |
|---|---|---|---|---|---|---|---|
| | | λ(mμ) | ε10⁻³ | λ(mμ) | ε10⁻³ | | |
| 5-fluorocytidine HCl (crude) | 0.1 N HCl | 284–5 | 11.2 | 244 | 1.69 | 2.45 | 0.595 |
| | 0.1 N NaOH | 275–6 | 7.80 | 256–7 | 5.84 | 1.22 | 0.265 |
| 5-fluorocytidine (pure) | 0.1 N HCl | 290 | 11.7 | 248–9 | 1.77 | 3.04 | 0.973 |
| | 0.1 N NaOH | 281 | 8.15 | 260–1 | 5.79 | 1.39 | 0.447 |
| 5-fluorocytidine HCl (pure) | 1 N HCl | 290 | 11.8 | 247 | 1.42 | 3.05 | 0.877 |
| 5-fluoro-2′-deoxycytidine | 0.1 N HCl | 289 | 11.4 | 250 | 1.70 | 3.03 | 0.963 |

*Analysis.*—Calculated for $C_{23}H_{19}N_2O_7F$: C, 60.79; H, 4.21; N, 6.17. Found: C, 60.56; H, 4.07; N, 5.91.

An efficiently stirred mixture containing 5.5 g. (0.012 mol) of 3′,5′-di-O-benzoyl-2′-deoxy-5-fluorouridine, 10.4 g. (0.047 mol) of phosphorus pentasulfide and 150 ml. of pyridine was heated to reflux temperature during which time a clear orange solution formed. Water was then added dropwise until the solution became permanently turbid (0.5 ml. water). Refluxing was continued for an additional five hours. The brown turbid solution was cooled to about 70° and one-half of the pyridine was removed by distillation in vacuo. The syrupy residue was poured in a thin stream into an ice water slurry and stirred for one-half hour during which time the semi-solid became granular. After filtration, the solid was taken up into a large volume of methylene chloride, washed with water and dried over sodium sulfate. The methylene chloride solution was concentrated to obtain 3′,5′ - di - O - benzoyl - 4 - thio - 2′ - deoxy - 5 - fluorouridine as a light yellow solid. The compound was recrystallized from absolute ethanol, M.P. 210–211°.

A solution of 1 gram of crude 3′,5′-di-O-benzoyl-4-thio-2′-deoxy-5-fluorouridine in 20 ml. of liquid ammonia was heated under nitrogen in a glass lined autoclave for six hours at 70–80° (liquid ammonia was used instead of alcoholic ammonia to avoid introduction of the alkoxy group). After evaporation of the ammonia in vacuo at 60°, a tan solid residue comprising crude 2′-deoxy-5-fluorocytidine was obtained which was taken up with 15 ml. of water. Some insoluble material was filtered off and the aqueous solution was extracted three times with 20 ml. portions of ether. The aqueous layer was freed of ether by partial evaporation in vacuo and rendered acid to Congo red with 1.3 ml. of 1 N hydrochloric acid.

This solution containing crude 2′-deoxy-5-fluorocytidine hydrochloride was passed through a 2.5 cm. x 35 cm. column of Dowex 50–X2 in the ammonium form (more particularly identified in Example 1) and chromatographed with water at a flow rate of about 20 ml. per fraction per half hour. Fractions 6 to 11 (130 ml.) were combined and gave a total absorption in the ultraviolet of 6090 at 280 mμ (in 0.1 N HCl) and a ratio $$\frac{300}{280} = 0.94$$

Paper chromatography with isopropanol-HCl produced only one spot. Evaporation of fractions 6–11 in vacuo gave 305 mg. of a glassy residue which was dissolved The starting material, 2′-deoxy-5-fluorouridine, not part of this invention, is itself novel and may be prepared according to the procedure described below:

Cells of *Streptococcus fecalis* (ATCC8043) were grown in AOAC folic acid assay medium [Lepper, Official and Tenative Methods of the Association of Official Agricultural Chemists, Washington, D.C., 7th ed., 784 (1950)] supplemented with 2 mg. per liter of thiamine [Prusoff, Proc. Soc. Exp. Biol. and Med., 85, 564 (1954)].

After 20 hours of incubation at 37°, the cells were harvested by centrifugation. The collected cells were washed three times with four volumes of potassium phosphate buffer solution (M/15 aqueous $KH_2PO_4$ solution, adjusted to pH 8.0 by addition of 2 N aqueous KOH) and the wet cells were weighed. The cells were finally suspended in the above potassium phosphate buffer solution, and ground in a glass tissue homogenizer.

An amount of enzyme preparation equivalent to 4.06 g. of wet cells was made up to 105 ml. with the above identified potassium phosphate buffer solution. 200 mg. (1.54 mM) of 5-fluorouracil and 1.50 g. (6.16 mM) of thymidine were dissolved in 15 ml. of the potassium phosphate buffer solution referred to above. The two solutions were mixed, making a total volume of 120 ml. The mixture was incubated at 37° for 18 hours. After this time, enzyme action was stopped by the addition of four volumes of acetone and one volume of peroxide-free diethyl ether. The precipitated solids were removed by filtration, and the filtrate was evaporated under nitrogen at reduced pressure until substantially all volatile organic solvent had been removed. About 20 ml. of aqueous solution remained. This solution was diluted to 100 ml. with distilled water.

The solution was again evaporated in vacuo to 5 ml., and rendered alkaline by addition of 20 ml. of 1 N aqueous sodium hydroxide solution, thereby producing a mixture containing sodium salts of: N-deoxyriboside of 5-fluorouracil, thymine, thymidine and 5-fluorouracil. This mixture was purified by adsorption of an ion exchange resin and subsequent elution by means of buffer solutions of gradually increasing acidity, whereby the pyrimidine components of the mixture were eluted in the following order: thymidine, thymine, 5-fluorouracil and 2′-deoxy-5-fluorouridine. The purification was effected by passing the above mentioned alkaline mixture through a 2.2 cm. x 27 cm. column of Dowex 1–X4 [Dow Chemical Co., Midland, Mich.; an anion exchange resin consisting of a cross linked copolymer of styrene with divinyl benzene (4% of the latter), containing quaternary ammonium groups as the functional groups] 100-200 mesh size, previously converted to formate form and washed to neutrality. The column was then eluted with 280 ml. aqueous ammonium formate buffer solution (pH 9.8) having a normality of 0.1 with respect to formate ion. The eluate contained no ultraviolet absorbing material. Elution was continued with aqueous ammonium formate buffer solution (pH 7.4) having a normality of 0.1 with respect to formate ion, at a flow rate of 46 ml. per hour. Then the elution was still further continued with aqueous ammonium formate buffer solution (pH 6.5) having a normality of 0.1 with respect to formate ion, at a flow rate of 60 ml. per hour. Fractions were separated at 30 minute intervals and individually examined for ultraviolet absorption at wave lengths of 260 m$\mu$ and 280 m$\mu$ (pH 14).

Examination of the ultraviolet absorption spectra of the individual fractions, and paper chromatography of the individual fractions, showed that fractions 6 to 17, inclusive, contained only thymine and thymidine, whereas fractions 34 to 48, inclusive, contained the fluoro compounds. Fractions 34 to 48, inclusive, were therefore combined and evaporated to dryness in vacuo. The residue obtained was dissolved in 30 ml. of the upper phase of a two-phase mixture obtained by mixing 60 volumes of ethyl acetate, 35 volumes of water, and 5 volumes of formic acid. A column 4.4 cm. x 49 cm. was then constructed by wetting 285 g. of cellulose powder (ashless, standard grade) with the upper phase of the above mentioned ethyl acetate-water-formic acid system, and tamping the wet cellulose into the absorption tube with a rod. The 30 ml. of solution were then passed through the column. Elution was performed with the upper phase of the same ethyl acetate-water-formic acid system mentioned above, at a flow rate of 40 ml. per hour, the fractions being collected at half hour intervals. The fractions were individually examined for ultraviolet absorption at wave lengths of 260 m$\mu$ and 280 m$\mu$ (pH 14).

Table III

| Fractions | Total absorption (pH 14) | | Average ratio, 280 m$\mu$/ 260 m$\mu$ | mM | |
|---|---|---|---|---|---|
| | 260 m$\mu$ | 280 m$\mu$ | | C | D |
| 1-56 | 0 | 0 | | | |
| 57-93 | 1,405 | 3,735 | 2.61 | 0.57 | 0.01 |
| 94 | 0 | 0 | | | |
| 95-96 | 118 | 124 | 1.05 | (¹) | 0.02 |
| 97-104 | 2,075 | 1,905 | 0.92 | 0 | ² 0.38 |

¹ Negligible.
² 0.39 mM of deoxyribose, when assayed by the method of Stumpf, J. Biol. Chem. 169, 367 (1947).

C=5-fluorouracil.
D=2'-deoxy-5-fluorouridine.

Fractions 97 to 104 were combined and evaporated to dryness in vacuo at 45°. The residue, 2'-deoxy-5-fluorouridine, was obtained as a colorless glass. The colorless glass was taken up in ethanol and evaporated to dryness three times until a crystalline residue resulted. This was recrystallized from butyl acetate, M.P. 152–153°.

2'-deoxy-5-fluorocytidine and its medicinally acceptable salts are useful as antibacterial and antifungal agents, being useful, for example, against *Paecilyomyces varioti, Bacillus simplex, Corynebacterium simplex, Sarcina lutea, Bacillus subtilis, Penicillium digitataum, Staphylococcus aureus, Proteus vulgaris, Lactobacillus leichmannii* and the like.

We claim:
1. A compound selected from the group consisting of 5-fluorocytosine-$N_1$-pentoside and medicinally acceptable acid addition salts thereof.
2. 5-fluorocytosine-$N_1$-riboside.
3. 5-fluorocytosine-$N_1$-2'-deoxyriboside.
4. 5-fluorocytidine.
5. 2'-deoxy-5-fluorocytidine.
6. 2',3',5'-tri-O-bnezoyl-4-thio-5-fluorouridine.
7. 3',5'-di-O-benzoyl-4-thio-2'-deoxy-5-fluorouridine.
8. A process which comprises reacting an O-acyl ester of 5-fluorouridine with a phosphorus sulfide in a basic medium and reacting the thiated reaction product with excess ammonia.
9. A process which comprises reacting 2',3',5'-tri-O-benzoyl-5-fluorouridine with phosphorus pentasulfide in a basic medium to produce 2',3',5'-tri-O-benzoyl-4-thio-5-fluorouridine and reacting the last named compound with excess ammonia to obtain 5-fluorocytidine.
10. A process which comprises reacting 3',5'-di-O-benzoyl-2'-deoxy-5-fluorouridine with phosphorus pentasulfide in a basic medium to obtain 3',5'-di-O-benzoyl-4-thio-2'-deoxy-5-fluorouridine and treating the last named compound with excess ammonia to obtain 2'-deoxy-5-fluorocytidine.
11. A process which comprises reacting 2',3',5'-tri-O-benzoyl-4-thio-5-fluorouridine with excess ammonia to obtain a 5-fluorocytidine.
12. A process which comprises reacting 3',5'-di-O-benzoyl-4-thio-2'-deoxy-5-fluorouridine was excess ammonia to obtain 2'-deoxy-5-fluorocytidine.
13. A process which comprises reacting an O-benzoyl ester of an $N_1$-ribosyl derivative of 4-thio-5-fluorocytosine with excess ammonia.

References Cited in the file of this patent

UNITED STATES PATENTS

| 2,624,732 | Hitchings et al. | Jan. 6, 1953 |
| 2,795,580 | Khorana | June 11, 1957 |
| 2,852,505 | Baker et al. | Sept. 16, 1958 |
| 2,885,396 | Heidelberger et al. | May 5, 1959 |

OTHER REFERENCES

Fukuhara et al.: "J. Biological Chemistry" 190, 95–100 (1950).

Friedkin Biochem and Biophys Acta. 18, 447–8 (1955).

UNITED STATES PATENT OFFICE
CERTIFICATE OF CORRECTION

Patent No. 3,002,965　　　　　　　　　　　　　　　　　October 3, 1961

Jack J. Fox et al.

It is hereby certified that error appears in the above numbered patent requiring correction and that the said Letters Patent should read as corrected below.

Column 1, line 47, for "O-benzoyl-2'-5-fluorouridine" read -- O-benzoyl-2'-deoxy-5-fluorouridine --; line 51, for "3',5',-di-O-" read -- 3',5'-di-O- --; line 54, for "5-fluoro-cytidine" read -- 5-fluorocytidine --; same column 1, line 58, for "$N_1$-filycosyl" read -- $N_1$-glycosyl --; column 3, Table I, headings to columns 2 and 3 should appear as shown below instead of as in the patent:

| Total Absorption | |
|---|---|
| 280 mµ | 300 mµ | same column 3, line 54, for "5-fluorocystidine" read -- 5-fluorocytidine --; column 4, line 36, for "-benzyl-" read -- -benzoyl- --; line 67, for "were" read -- are --; column 6, line 7, for "-5-fluorocytdine" read -- -5-fluorocytidine --; line 32, for "Tenative" read -- Tentative --; line 39, for "M/15" read -- $\frac{M}{15}$ --; same column 6, line 65, for "of" read -- on --; column 8, line 8, for "digitataum", in italics, read -- digitatum --, in italics; line 16, for "-bnezoyl-" read ---benzoyl- --; line 38, strike out "a"; line 40, for "was" read -- with --; same column 8, list of references cited, under OTHER REFERENCES, add the following:

Johnson, Jr., et al: "J. Am. Chem. Soc." 78, 3863 (1956).

Signed and sealed this 24th day of April 1962.

(SEAL)
Attest:

ESTON G. JOHNSON
Attesting Officer

DAVID L. LADD
Commissioner of Patents